United States Patent
Aalto et al.

(10) Patent No.: US 8,592,638 B2
(45) Date of Patent: Nov. 26, 2013

(54) PROCESS FOR THE PREPARATION OF LIGHT FUELS

(75) Inventors: Pekka Aalto, Porvoo (FI); Ville Alopaeus, Espoo (FI); Elina Harlin, Kerava (FI); Raimo Linnaila, Porvoo (FI); Leena Rantanen-Kolehmainen, Porvoo (FI)

(73) Assignee: Neste Oil Oyj, Espoo (FI)

( * ) Notice: Subject to any disclaimer, the term of this patent is extended or adjusted under 35 U.S.C. 154(b) by 683 days.

(21) Appl. No.: 12/837,627

(22) Filed: Jul. 16, 2010

(65) Prior Publication Data

US 2011/0015459 A1    Jan. 20, 2011

Related U.S. Application Data

(60) Provisional application No. 61/274,103, filed on Jul. 17, 2009.

(30) Foreign Application Priority Data

Jul. 17, 2009    (EP) .................................... 09165803

(51) Int. Cl.
*C10G 1/00* (2006.01)
*C10G 1/06* (2006.01)
*C07C 1/20* (2006.01)
*C07C 4/06* (2006.01)

(52) U.S. Cl.
USPC .............. 585/240; 585/242; 585/310; 44/605

(58) Field of Classification Search
USPC .............................. 585/240–242, 310; 44/605
See application file for complete search history.

(56) References Cited

U.S. PATENT DOCUMENTS

| | | | |
|---|---|---|---|
| 4,992,605 A * | 2/1991 | Craig et al. ................... | 585/240 |
| 5,233,109 A | 8/1993 | Chow | |
| 7,279,018 B2 | 10/2007 | Jakkula et al. | |

(Continued)

FOREIGN PATENT DOCUMENTS

| EP | 1396531 | 3/2004 |
|---|---|---|
| EP | 1681337 | 7/2006 |

(Continued)

OTHER PUBLICATIONS

EP Search Report for Application No. 09165803 dated Jan. 7, 2010.

(Continued)

*Primary Examiner* — Nina Bhat
*Assistant Examiner* — Jonathan Miller
(74) *Attorney, Agent, or Firm* — Andrus, Sceales, Starke & Sawall, LLP

(57) ABSTRACT

In the process of the invention, an aliphatic $C_2$-$C_{14}$ hydrocarbon product is prepared from natural fats or derivatives thereof. The process comprises the steps of: (i) providing a natural fat or derivative thereof, (ii) deoxygenating a natural fat or derivative thereof originating from step (i) to yield an aliphatic $C_9$-$C_{28}$ hydrocarbon, (iii) hydrocracking an aliphatic $C_9$-$C_{28}$ hydrocarbon originating from step (ii) to yield a product comprising an aliphatic $C_2$-$C_{14}$ hydrocarbon, (iv) isomerising an aliphatic $C_2$-$C_{14}$ hydrocarbon originating from step (iii) into an isomerised aliphatic $C_2$-$C_{14}$ hydrocarbon, and optionally (v) recovering an isomerised $C_2$-$C_{14}$ hydrocarbon originating from step (iv) as said $C_2$-$C_{14}$ hydrocarbon product. Pure and high quality light fuel is easily obtained in sufficient amounts.

20 Claims, 1 Drawing Sheet

(56) References Cited

U.S. PATENT DOCUMENTS

| | | | |
|---|---|---|---|
| 7,491,858 B2 * | 2/2009 | Murzin et al. | 585/240 |
| 7,816,570 B2 * | 10/2010 | Roberts et al. | 585/240 |
| 7,928,273 B2 * | 4/2011 | Bradin | 585/14 |
| 8,022,258 B2 * | 9/2011 | Myllyoja et al. | 585/240 |
| 8,212,094 B2 * | 7/2012 | Myllyoja et al. | 585/240 |
| 8,329,968 B2 * | 12/2012 | Brandvold et al. | 585/240 |
| 8,350,102 B2 * | 1/2013 | Roberts et al. | 585/240 |
| 8,350,103 B2 * | 1/2013 | Roberts et al. | 585/240 |
| 2007/0131579 A1 * | 6/2007 | Koivusalmi et al. | 208/19 |
| 2007/0260102 A1 * | 11/2007 | Santiago et al. | 585/733 |
| 2008/0229654 A1 * | 9/2008 | Bradin | 44/308 |
| 2008/0244962 A1 * | 10/2008 | Abhari et al. | 44/308 |
| 2009/0158637 A1 | 6/2009 | McCall et al. | |
| 2009/0162264 A1 | 6/2009 | McCall et al. | |
| 2009/0229172 A1 * | 9/2009 | Brady et al. | 44/307 |
| 2009/0229174 A1 * | 9/2009 | Brady et al. | 44/308 |
| 2009/0294324 A1 * | 12/2009 | Brandkanen et al. | 208/17 |
| 2010/0000908 A1 * | 1/2010 | Markkanen et al. | 208/49 |
| 2011/0155631 A1 * | 6/2011 | Knuuttila et al. | 208/15 |

FOREIGN PATENT DOCUMENTS

| | | |
|---|---|---|
| EP | 1741767 | 1/2007 |
| EP | 1741768 | 1/2007 |
| EP | 1795576 | 6/2007 |
| GB | 1524781 | 9/1978 |
| WO | 2007003709 | 1/2007 |
| WO | WO 2007027955 A2 * | 3/2007 |
| WO | 2008103204 | 8/2008 |
| WO | 2008157465 | 12/2008 |
| WO | 2009120242 | 10/2009 |
| WO | 2009130392 | 10/2009 |

OTHER PUBLICATIONS

International Search Report for PCT/FI2010/050582 dated Feb. 7, 2011.

Written Opinion for PCT/FI2010/050582 dated Feb. 7, 2011.

* cited by examiner

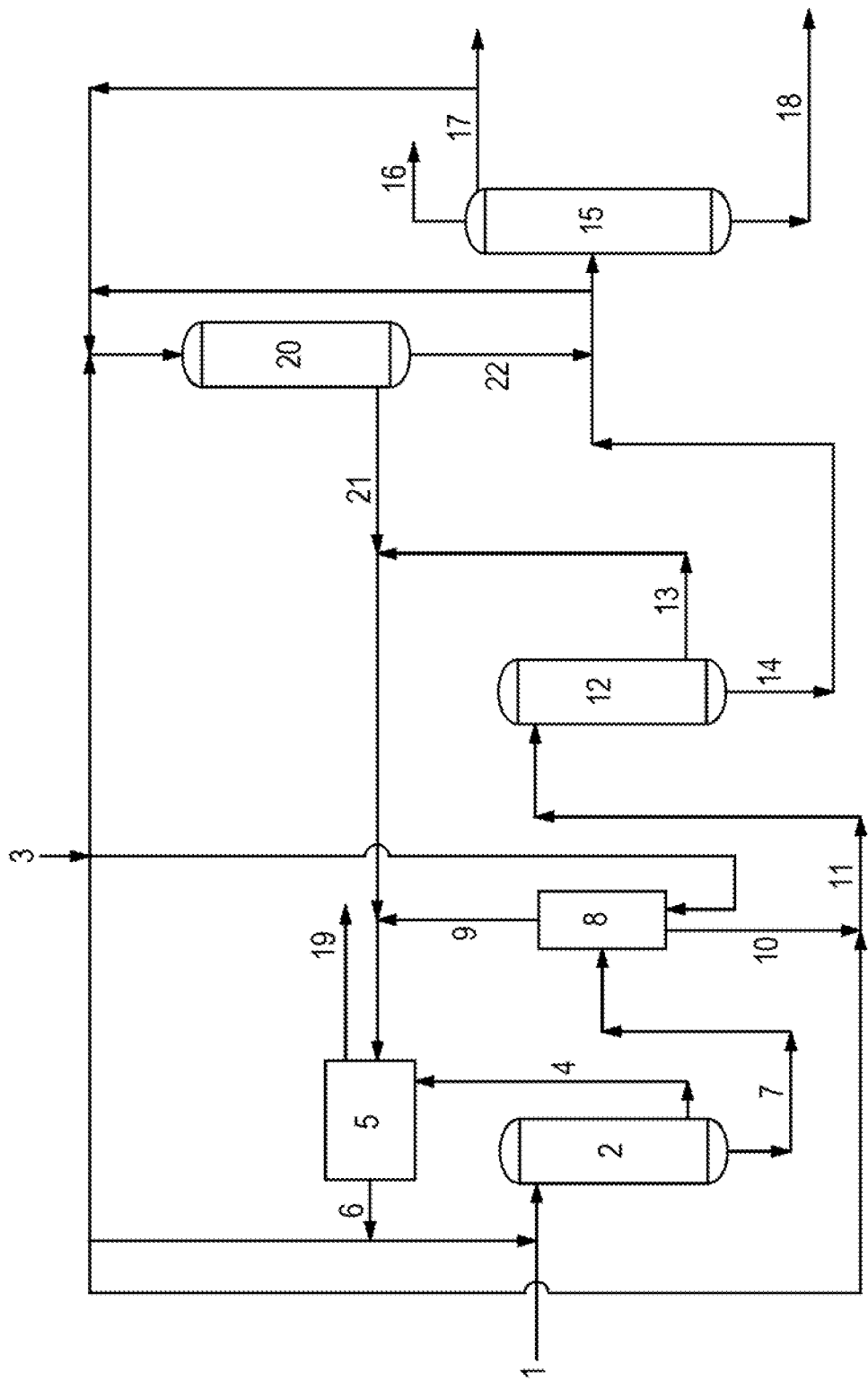

PROCESS FOR THE PREPARATION OF LIGHT FUELS

CROSS-REFERENCE TO RELATED PATENT APPLICATIONS

This application claims the benefit under 35 U.S.C. §119(e) to U.S. Provisional Patent Application No. 61/274,103, filed on Jul. 17, 2009, the content of which is incorporated by reference in its entirety. This application also claims the benefit under 35 U.S.C. §119(a) to European Patent Application No. 09165803.9, filed on Jul. 17, 2009.

BACKGROUND

The invention relates to a process for the preparation of an aliphatic $C_2$-$C_{14}$ hydrocarbon product, such as a hydrocarbon in the liquefied petroleum gas (LPG) and gasoline distillation range, from a natural fat or derivative thereof.

In order to meet an increasing demand for fuels in general and ecological fuels in particular, producers have started to prepare liquid hydrocarbon fuels from biological sources. If such biological fuels can be prepared easily and in good quality, they become an attractive alternative for the increasingly scarce mineral oil based fuels. At the same time, their burden on the environment will be smaller. Natural fats and derivatives thereof contain long hydrocarbon chains and are therefore considered to be the best raw materials for hydrocarbon fuels of biological origin.

Natural fats are substances consisting of one or more tri-esters of glycerine and fatty acids, so called triglycerides. Derivatives of natural fats are generally fatty acids, other fatty acid esters, fatty alcohols, their chemical analogues and derivatives. Biological fuels have traditionally been prepared from natural fats and derivatives thereof by transesterification, deoxygenation and different types of cracking.

The preparation of diesel fuel from natural fats or derivatives thereof has been studied extensively. Among others, FI 100248, EP 1396531 B1, U.S. Pat. No. 7,279,018 B2, EP 1681337 A1, EP 1741767 A1, EP 1741768 A1, EP 1795576 A1 and WO 2008157465 describe processes for producing diesel hydrocarbons and are incorporated herein by reference in their entireties.

The preparation of lower aliphatic $C_2$-$C_{14}$ hydrocarbons such as gasoline from natural fats or derivatives thereof has been studied very little. GB 339048 feeds heated gaseous soya bean oil together with hydrogen over a catalyst and obtains gasoline or benzine-like hydrocarbons. U.S. Pat. No. 2,163,563 passes a mixture of fat and mineral oil over a Ni catalyst at 20 MPa and 360° C. converting the fat into corresponding hydrocarbons, and separating the hydrocarbons from the mineral oil by distillation. These patent references, GB 339048 and U.S. Pat. No. 2,163,563, are incorporated herein by reference in their entireties.

GB 1524781 pyrolyses vegetable oil catalytically and obtains liquid hydrocarbons as well as gaseous hydrocarbons containing 50-70 volume-% of lower olefins. U.S. Pat. No. 5,233,109 cracks natural oil into crude petroleum at 420-550° C. and 0.1-1.0 MPa using a 1-10-fold amount of alumina based catalyst. These patent references, GB 1524781 and U.S. Pat. No. 5,233,109, are incorporated herein by reference in their entireties.

Conventional preparations of aliphatic $C_2$-$C_{14}$ hydrocarbons from natural fats or derivatives thereof are mostly uncontrolled cracking methods. Applicant has found that, in addition to the above-mentioned olefins, considerable amounts of aromatic hydrocarbons and coke are formed. Such by-products are harmful to the catalysts. In addition, the natural fats and their derivatives contain heteroatomic impurities which cannot be effectively removed by conventional methods.

In view of the above, the main objective of the invention is to provide an alternative process for the preparation of aliphatic $C_2$-$C_{14}$ hydrocarbons from natural fats or derivatives thereof. More specifically, an objective of the invention is to prepare aliphatic $C_2$-$C_{14}$ hydrocarbons from natural fats or derivatives thereof with improved yield and octane number. Still further objectives of the invention are to prepare aliphatic $C_2$-$C_{14}$ hydrocarbons from natural fats or derivatives thereof with minimal formation of olefins, aromatics, coke and other impurities. Finally, a process is aimed at which enables the preparation of $C_2$-$C_{14}$ hydrocarbons of biological origin with a minimum of resources.

SUMMARY

As was initially stated, the invention relates to a process for the preparation of an aliphatic $C_2$-$C_{14}$ hydrocarbon product from a natural fat or derivative thereof. The above-mentioned objectives of the invention have now been achieved mainly by (i) providing a natural fat or derivative thereof, (ii) deoxygenating a natural fat or derivative thereof originating from step (i) to yield an aliphatic $C_9$-$C_{28}$ hydrocarbon, (iii) hydrocracking an aliphatic $C_9$-$C_{28}$ hydrocarbon originating from step (ii) yielding a product comprising an aliphatic $C_2$-$C_{14}$ hydrocarbon, (iv) isomerising an aliphatic $C_2$-$C_{14}$ hydrocarbon originating from step (iii) into an isomerised aliphatic $C_2$-$C_{14}$ hydrocarbon, and optionally (v) recovering an isomerised $C_2$-$C_{14}$ hydrocarbon originating from step (iv) as said $C_2$-$C_{14}$ hydrocarbon product.

BRIEF DESCRIPTION OF THE FIGURES

FIG. 1 provides a schematic illustrating the preparation of $C_2$-$C_{14}$ hydrocarbons from natural fats or derivatives thereof.

DETAILED DESCRIPTION

The use here of an indefinite article together with the expression "originating from" means that, within the claimed scope of protection, further steps, such as purification and separation steps, may occur between steps (i)-(iv). Also, the product of any step might completely or partly, be circulated back to a step preceding it. By an aliphatic $C_2$-$C_{14}$ hydrocarbon is meant a single hydrocarbon having a carbon number selected from within the range 2-14, or a mixture of such hydrocarbons.

Thus, an approach involving at least three distinct process steps; a deoxygenation step (ii), a hydrocracking step (iii), and a $C_2$-$C_{14}$ isomerisation step (iv) has proven to be more useful that the typical one-step systems described in the state of the art.

In stage (i) of the claimed process, a natural fat or a derivative thereof is provided. By natural fat is here meant a native solid or liquid triglyceride of a $C_{10}$-$C_{28}$ fatty acid or a mixture of such triglycerides. The triglyceride has the following general formula (1):

(1)

wherein $R^1$, $R^2$ and $R^3$ are similar or different aliphatic $C_9$-$C_{27}$ hydrocarbyl groups. The aliphatic group may be saturated or (mono- or poly-) unsaturated. Fatty acids found in native triglycerides are almost solely fatty acids of even carbon number.

In formula (1), $R^1$, $R^2$ and $R^3$ are preferably similar or different aliphatic $C_{11}$-$C_{23}$ hydrocarbyl groups, more preferably similar or different aliphatic $C_{11}$-$C_{19}$ hydrocarbyl groups, most preferably similar or different aliphatic $C_{15}$ or $C_{17}$ hydrocarbyl groups.

The natural fat used in the invention is typically an animal or plant fat or oil (here, oils are defined as fats) selected from: the lauric-myristic acid group ($C_{12}$-$C_{14}$) including milk fats, as well as coconut oil, palmseed oil, babassu oil, muscat butter oil, laurel seed oil; from the palmitic acid group ($C_{16}$) including earth animal fats, as well as palm oil and stillingia tallow; the stearic acid group ($C_{18}$) including fats of earth animals, as well as cocoa butter, shea butter and Borneo tallow; the oleic and linoleic acid group (unsatd. $C_{18}$) including whale and fish oils as well as tall oil (fatty acid fraction), rapeseed or canola oil, olive oil, peanut oil, sesame oil, maize oil, sunflower oil, poppy seed oil, cottonseed oil and soy oil; the linolenic acid group (unsatd. $C_{18}$) further including linseed oil, perilla oil and hemp oil; the erucic acid group (unsatd. $C_{22}$) including whale and fish oils as well as rapeseed oil and mustard seed oil; the eleostearic acid group (conjug. unsatd. $C_{18}$) including whale and fish oils as well as chinese wood oil; and fats with substituated fatty acids (ricinoleic acid, $C_{18}$) such as castor oil. Suitable oils or fats are also Jatropha seed oils as well as fats and oils originating from processes using microbes, such as algae, bacteria, yeasts and molds.

Derivatives of natural fats include mono- or diglycerides of $C_{10}$-$C_{28}$ fatty acids, $C_{10}$-$C_{28}$ fatty acids, $C_{10}$-$C_{28}$ fatty acid anhydrides, non-glyceride $C_{10}$-$C_{28}$ fatty acid esters, $C_{10}$-$C_{28}$ fatty alcohols, $C_{10}$-$C_{28}$ fatty aldehydes and $C_{10}$-$C_{28}$ fatty ketones. The $C_{10}$-$C_{28}$ fatty acids, their mono- and diglycerides, as well as their anhydrides are typically prepared by hydrolysis of the corresponding triglyceride. The non-glyceride $C_{10}$-$C_{28}$ fatty acid esters are mainly prepared from the triglycerides by transesterification. The $C_{10}$-$C_{28}$ fatty alcohols, aldehydes and ketones are prepared by reduction, usually by hydrogenation, of the corresponding fatty acids.

The derivatives of natural fats also include any of the aforementioned natural fats and derivatives, the hydrocarbon chain of which has been modified e.g. by substitution, branching or saturation.

The natural fats or derivatives thereof may be provided in pure form or as part of a feedstock containing other components. Preferably, the feedstock contains at least 20% by weight, more preferably at least 30% by weight, most preferably at least 40% by weight, of pure natural fat or fatty derivative. Contaminating metals may be removed from the feedstock e.g. by treatment with mineral acids. Phosphorus which mostly occurs in the form of phosphatides may be removed by degumming, and the amount of free fatty acids may be reduced e.g. by dry distillation or steam stripping. Finally, the raw material may be bleached and/or deodorized. The triglycerides can also be prehydrogenated (pretreated with hydrogen) in order to reduce unsaturation, sulphur and nitrogen content.

In step (ii) of the claimed process, the natural fat or derivative thereof originating from step (i) is deoxygenated into one or more $C_9$-$C_{28}$ hydrocarbons. By deoxygenation is here meant the partial or complete removal of oxygen from the molecules of the above-mentioned triglycerides, fatty acids, fatty acid analogues or derivatives. Among other reactions, the deoxygenation may involve hydrogenation (reaction with hydrogen), hydrolysis (reaction with water), decarbonylation (removal of carbonyl as carbon monoxide) and/or decarboxylation (removal of carboxyl as carbon dioxide).

Products of the deoxygenation step (ii) are aliphatic $C_9$-$C_{28}$ hydrocarbons, preferably aliphatic $C_{11}$-$C_{24}$ hydrocarbons, more preferably aliphatic $C_{11}$-$C_{20}$ hydrocarbons, most preferably aliphatic $C_{15}$-$C_{18}$ hydrocarbons.

The deoxygenation in step (ii) advantageously involves hydrogenation, i.e. the use of hydrogen to remove oxygen. In that case, the deoxygenation is called hydrodeoxygenation, HDO. Without limiting the scope of protection, HDO is believed to involve to some extent all of the above-mentioned deoxygenation reactions. Without limiting the scope of protection, the reactions are in the following exemplified for stearic acid $C_{17}H_{35}COOH$ and its triglyceride:

Hydrolysis:

$$C_3H_5(OOC\ C_{17}H_{35})_3 + 3H_2O \leftrightarrow 3C_{17}H_{35}COOH + C_3H_5(OH)_3 \quad (2)$$

Hydrogenation:

$$C_{17}H_{35}COOH + 3H_2 \rightarrow C_{18}H_{38} + 2H_2O \quad (3)$$

Decarbonylation:

$$C_{17}H_{35}COOH + H_2 \rightarrow C_{17}H_{36} + CO + H_2O \quad (4a)$$

$$C_{17}H_{35}COOH \rightarrow C_{17}H_{34} + CO + H_2O \quad (4b)$$

Decarboxylation:

$$C_{17}H_{35}COOH \rightarrow C_{17}H_{36} + CO_2 \quad (5)$$

The HDO of stearic acid triglyceride into $C_{17}$ and $C_{18}$ hydrocarbons involve the hydrolysis (2) of triglyceride into glycerine and stearic acid. Reactions (3)-(5) deal with the decomposition of stearic acid into said hydrocarbons. In addition to the pure hydrogenation step (3), which gives hydrocarbon molecules of original fatty acid chain length ($C_{18}$), the HDO process is believed to involve decarbonylation (4a, 4b) and decarboxylation (5). These reactions give carbon monoxide or carbon dioxide and a hydrocarbon chain having one carbon less ($C_{17}$) than the original chain.

Preferably, the deoxygenating step (ii) is carried out by hydrolyzing, decarbonylating, decarboxylating, and/or, preferably, treating with hydrogen, i.e. hydrodeoxygenating, the natural fat or derivative thereof.

The HDO step (ii) is typically carried out by feeding hydrogen and the natural fat or derivative thereof (co-currently or countercurrently) through a catalyst bed. A suitable process and apparatus is described in EP1741767 A1, the content of which is incorporated herein by reference (see in particular FIG. 1 and paragraphs [0061] to [0064]).

The HDO step (ii) is preferably carried out at a temperature between 100 and 450° C., preferably between 250 and 350° C., more preferably between 280 and 345° C., most preferably between 280 and 310° C. A preferred pressure is 1 to 20 MPa, a more preferable one 3 to 10 MPa, the most preferable one being 4 to 8 MPa.

The HDO step (ii) is preferably carried out in the presence of a hydrogenation catalyst containing one or more metals from Groups 6 to 10 of the Periodic Table (IUPAC 1990) supported on alumina and/or silica. Preferred hydrogenation catalysts are alumina and/or silica supported Pd, Pt, Ni, NiMo, or CoMo. The most preferred catalysts are NiMo/$Al_2O_3$ and CoMo/$Al_2O_3$ in sulphidized form.

The deoxygenation step (ii) and especially its HDO embodiment yields $C_9$-$C_{28}$ hydrocarbons, which have low amounts of unsaturation and heteroatom impurities. Such hydrocarbons are especially suitable for hydrocracking into lower $C_2$-$C_{14}$ hydrocarbons.

Optionally, there is a purification step after the deoxygenation step (ii). The product from deoxygenation is purified using a suitable method such as stripping with steam or a suitable gas such as light hydrocarbon, nitrogen or hydrogen. Preferably, acid gases and water impurities are removed as completely as possible before the $C_9$-$C_{28}$ hydrocarbon is contacted with the hydrocracking catalyst.

The aliphatic $C_9$-$C_{28}$ hydrocarbon obtained from the deoxygenation step (ii) and/or an isomer thereof (see below, step (ii')) are in a hydrocracking step (iii) hydrocracked into aliphatic light hydrocarbons such as dry gas, LPG (Liquified Petroleum Gas), and/or gasoline. Preferably, the hydrocracking step (iii) yields aliphatic $C_2$-$C_{14}$ hydrocarbon such as LPG and/or gasoline, most preferably aliphatic $C_2$-$C_8$ hydrocarbons such as light gasoline.

Cracking processes produce lighter $C_2$-$C_{14}$ hydrocarbon products such as liquefied petroleum gas (LPG) and gasoline from heavier $C_9$-$C_{28}$ hydrocarbons. If the cracking is carried out by heat alone, it is called thermal cracking. If a catalyst is used, but no hydrogen, it is called catalytic cracking. If the cracking is carried out in the presence of hydrogen and a suitable catalyst, it is called hydrocracking.

In thermal cracking, the carbon-carbon bonds of heavier hydrocarbons are cleaved homolytically into radicals (initiation), which may form further hydrocarbon radicals (hydrogen abstraction), decompose into lighter olefins and hydrogen radicals (radical decomposition), react with olefins into longer radicals (radical addition) or terminate into lighter saturated (recombination) or unsaturated (disproportionation) hydrocarbons. In catalytic cracking, similar decomposition takes place as in thermal cracking, but by heterolytic bond cleavage (through ion formation).

The cracking step of the instant invention is a hydrocracking step (iii). Hydrocracking is a cracking process which uses a suitable catalyst, hydrogen pressure and moderate temperatures. Hydrocracking mainly differs from thermal and catalytic cracking in that its product contains relatively little olefins and aromatics. Furthermore, harmful heteroatomic (S and N) compounds are in the hydrocracking step (iii) reduced by hydrogen into less harmful derivatives, like $H_2S$ and $NH_4$-, or optionally removed. This is very important, because unsaturation may lead to unwanted by-products and heteroatomic impurities may disturb the actual cracking reactions.

The product of the hydrocracking step (iii) depends on its reaction conditions such as the temperature and pressure, and especially the partial hydrogen pressure. It also depends on the quality and quantity of the catalyst. The hydrocracking step (iii) is preferably carried out by feeding a $C_9$-$C_{28}$ hydrocarbon in liquid form together with hydrogen gas through a reactor having hydrocracking conditions and a hydrocracking catalyst.

In the hydrocracking step (iii), the preferred conditions are the following. The feeding rate LHSV of aliphatic $C_9$-$C_{28}$ hydrocarbon is preferably between 0.1 and 10 1/h, more preferably between 0.1 and 5 1/h, and most preferably between 0.2 and 3 1/h. LHSV means Liquid Hourly Space Velocity, i.e. the volume flow of liquid feed per hour relative to the bed volume of the catalyst. The volume ratio of hydrogen to aliphatic $C_9$-$C_{28}$ hydrocarbon in the feed is preferably between 10 and 2000 $m^3/m^3$ (NTP), more preferably between 100 and 1500 $m^3/m^3$ (NTP), and most preferably between 300 and 1500 $m^3/m^3$ (NTP).

In the hydrocracking step (iii), the temperature is preferably maintained between 100 and 700° C., more preferably between 200 and 500° C., and most preferably between 280 and 400° C. The pressure is preferably maintained between 1 to 20 MPa, more preferably between 1 and 15 MPa, and most preferably between 1 and 10 MPa.

The catalysts used in the hydrocracking step (iii) are usually bifunctional substances which possess acidic and metallic functions. The acidic functionality is e.g. provided by alumina, silica, aluminasilica and/or a molecular sieve. The metallic functionality is typically provided by a metal component selected from Groups 8-10 of the Periodic Table (IUPAC 1990), often combined with a Group 6 metal, such as Ni—W, Co—Mo and Ni—Mo. Also Group 8-10 metal promoted and anion-modified Group 4 metal oxides such as Pt/$ZrO_2$/$SO_4$ and Pt/$ZrO_2$/$WO_3$ may be used.

Preferably, the hydrocracking step (iii) is carried out in the presence of a catalyst which contains a molecular sieve as the acidic function, a transition metal selected from Groups 8 to 10 of the Periodic Table (IUPAC 1990) as the metallic function, and optionally further alumina or silica. Preferred transition metals are Ni, Pd and, especially Pt. Useful molecular sieves are zeolites such as ZSM-22 and ZSM-23. Suitable other molecular sieves with properties like the zeolites are the silicoaluminophosphates (SAPO). Pt in combination with the large-pore SAPO-5 mainly gives hydrocracking while a combination of Pt with smaller pore SAPO-31 or SAPO-41 favours monobranched isomerisation. See the description of the $C_2$-$C_{14}$ isomerisation step (iv) below.

The amount of molecular sieve providing the acidic function is preferably from 20 to 80% by weight of the hydrocracking catalyst. The amount of metal providing the metallic function is preferably from 0.1 to 30% by weight of the hydrocracking catalyst, more preferably from 0.5 to 20%.

Preferably, the catalyst of the hydrocracking step (iii) contains as the molecular sieve SAPO-11, SAPO-41, ZSM-12, ZSM-22, ZSM-23, ZSM-48 or ferrierite and as the transition metal Pt, Pd or Ni, and as a carrier $Al_2O_3$ and/or $SiO_2$.

The most preferred hydrocracking catalysts used in the invention are selected from the group consisting of Pt/ZSM-22/$Al_2O_3$, Pt/ZSM-23/$Al_2O_3$, Pt/ZSM-12/$Al_2O_3$, Pt/ZSM-48/$Al_2O_3$, Pt/SAPO-11/$Al_2O_3$, and Pt/SAPO-11/$SiO_2$.

In one embodiment of the invention, at least part of the aliphatic $C_9$-$C_{28}$ hydrocarbon obtained in the deoxygenation step (ii) is in step (iii) hydrocracked into an aliphatic $C_2$-$C_{14}$ hydrocarbon, while the remaining part may be separated, possibly isomerised and recovered as heavier ($C_9$-$C_{28}$, e.g. diesel) fuel or its raw material. One advantage of the claimed process is thus that, because it combines deoxygenation, which is used for preparing diesel fuel, and hydrocracking, which is used for preparing gasoline, it can be used for preparing both fuels simultaneously in desired amounts.

In the instant invention, an aliphatic $C_2$-$C_{14}$ hydrocarbon originating from the hydrocracking step (iii) is in a $C_2$-$C_{14}$ isomerisation step (iv) isomerised in order to refine it into high-quality light fuel. After the isomerisation step (iv), the cracked and isomerised $C_2$-$C_{14}$ hydrocarbon mixture is optionally in step (v) typically recovered as the aliphatic $C_2$-$C_{14}$ hydrocarbon product of the invention. When carrying out the $C_2$-$C_{14}$ isomerisation step (iv) after the hydrocracking step (iii), a product having greatly improved octane number is obtained.

The $C_2$-$C_{14}$ isomerisation step (iv) is preferably carried out at a temperature between 100 and 500° C., more preferably between 150 and 400° C., most preferably between 200 and 300° C., and a pressure of between 1 and 20 MPa, more preferably between 2 and 15 MPa, most preferably between 2 and 10 MPa.

The $C_2$-$C_{14}$ isomerising step (iv) is advantageously carried out in the presence of a catalyst based on a hydrogen transfer component and an acid component. Preferably, the hydrogen transfer (hydrogenating and/or dehydrogenating) component is a transition metal selected from Groups 5-10 of the Periodic Table (IUPAC 1990), more preferably selected from Ni, Pd, Pt, Co, Mo and V, and most preferably is platinum. The acid component is preferably an inorganic oxide compound having acid sites, more preferably selected from chlorinated alumina and protonated 10- and 12-membered zeolites, even more preferably selected from protonated PSH-3, Beta- and MCM-22 zeolites. Most preferably the acid component is protonated mordenite, protonated beta-zeolite or protonated ZSM-12.

The preferred transition metal content of the catalyst used in step (iv) is between 0.01 and 5 wt.-%, most preferably between 0.1 and 1 wt.-%.

As was said above, the claimed process may include additional steps between the five main steps (i)-(v). According to one embodiment, at least part of the aliphatic $C_9$-$C_{28}$ hydrocarbon product originating from the deoxygenation step (ii) may be isomerised in a $C_9$-$C_{28}$ isomerisation step (ii') before or during the hydrocracking step (iii). The product of this optional $C_9$-$C_{28}$ isomerisation step (ii') may be recovered as isomerised $C_9$-$C_{28}$ heavy (diesel) fuel and/or hydrocracked in the following hydrocracking step (iii).

The product obtained from the deoxygenation step (ii) is in the optional $C_9$-$C_{28}$ isomerisation step (ii') isomerised with a catalyst under isomerisation conditions. The feed into the isomerisation reactor is a mixture of essentially pure $C_9$-$C_{28}$ hydrocarbons and the composition of the feed can be predicted from the fatty acid distribution of each individual natural fat or its derivative.

The $C_9$-$C_{28}$ isomerisation step (ii') may further comprise an optional purification step, wherein the reaction product from the deoxygenation, preferably the HDO step (ii), is purified using a suitable method such as stripping with steam or a suitable gas such as light hydrocarbon, nitrogen or hydrogen. Preferably, acid gases and water impurities are removed as completely as possible before the $C_9$-$C_{28}$ hydrocarbon is contacted with the isomerisation catalyst.

In the $C_9$-$C_{28}$ isomerisation step (ii'), the pressure preferably varies in the range of 2-15 MPa, more preferably in the range of 3-10 MPa and the temperature is preferably between 110 and 700° C., more preferably between 200 and 500° C., most preferably between 250 and 400° C.

In the $C_9$-$C_{28}$ isomerisation step (ii'), isomerisation catalysts known in the art may be used. They typically contain a molecular sieve and/or a metal selected from Groups 8-10 of the Periodic Table (IUPAC 1990) and/or a carrier. Preferably, the $C_9$-$C_{28}$ isomerisation catalyst contains SAPO-11, SAPO-41, ZSM-12, ZSM-22, ZSM-23 or ZSM-48 or ferrierite and Pt, Pd or Ni and $Al_2O_3$ or $SiO_2$. Typical isomerisation catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. Most of these catalysts require the presence of hydrogen to reduce catalyst deactivation.

The isomerised $C_9$-$C_{28}$ hydrocarbon product of step (ii') consists mainly of hydrocarbons with more branching and less linearity and it has a boiling range of about 180-350° C.

In the following hydrocracking step (iii), the isomerised $C_9$-$C_{28}$ hydrocarbon product is then cracked to get a $C_2$-$C_{14}$ hydrocarbon product.

According to one embodiment of the invention, all of the $C_9$-$C_{28}$ hydrocarbon is in the hydrocracking step (iii) converted into aliphatic $C_2$-$C_{14}$ hydrocarbons which are then in step (iv) isomerised into, and recovered as, said aliphatic $C_2$-$C_{14}$ hydrocarbon product.

According to another embodiment, in the hydrocracking step (iii), the aliphatic $C_9$-$C_{28}$ hydrocarbon obtained from the deoxygenation step (ii) or the $C_9$-$C_{28}$ isomerization step (ii'), is at least partly hydrocracked, yielding a mixture of lighter and heavier hydrocarbons. These hydrocarbon fractions may then be distilled into different fractions. Alternatively, they may be isomerised before or after separation.

Yet, according to a preferred embodiment the aliphatic $C_9$-$C_{28}$ hydrocarbon obtained in the deoxygenating step (ii) or the $C_9$-$C_{28}$ isomerisation step (ii'), is at least partly hydrocracked in step (iii) into an aliphatic $C_2$-$C_8$ hydrocarbon, the rest that may remain from steps (ii) or (ii') being separated and recovered as heavier ($C_9$-$C_{28}$) fuel or a raw material thereof, or alternatively, fed back to the hydrocracking step (iii).

In the following, embodiments of the invention are described more closely by referring to FIG. 1 showing the preparation of $C_2$-$C_{14}$ hydrocarbons from natural fats or derivatives thereof.

In FIG. 1, pretreated natural fat or derivative thereof (1) is fed to a hydrodeoxygenation (HDO) unit (2) where it is deoxygenated in the presence of added hydrogen make up gas (3). During this hydrodeoxygenation the natural fat or its derivative is deoxygenated into aliphatic $C_9$-$C_{28}$ hydrocarbons. Part of the hydrogen remains unreacted and is together with possible gaseous by-products recovered (4) from the HDO unit (2). Thereafter, the hydrogen is in a gas purification unit (5) separated from the gaseous byproducts (19) such as carbon monoxide, carbon dioxide and water. The separated hydrogen is fed from the gas purification unit (5) back (6) to the HDO unit (2) and the possible gaseous byproducts are recovered.

From the bottom of the HDO unit (2), the aliphatic $C_9$-$C_{28}$ hydrocarbons are fed (7) into a stripper unit (8) which separates dissolved hydrogen and possible gaseous dissolved by products (9) from the aliphatic $C_9$-$C_{28}$ hydrocarbons (10). The stripping gas (make up hydrogen) (3) is fed to the stripper (8) counter-currently. The gas (9) is removed from the top of the stripper unit (8) and purified in the gas purification unit (5) before being fed back (6) to the initial feedstock (1). The $C_9$-$C_{28}$ hydrocarbons are collected (10) from the bottom of the stripper unit (8), combined with hydrogen make up gas (3) and fed (11) to the hydrocracking unit (12) where they are hydrocracked. Unreacted hydrogen and possible gaseous by-products (13) are removed from the hydrocracking unit (12) and fed to the gas purification unit (5).

The hydrocracking product (14) is removed from the bottom of the hydrocracking unit (12) and fed to the distillation unit (15) or $C_2$-$C_{14}$ isomerisation unit (20), partly or totally, optionally part of the biogasoline (17) or any other product recycled from the final distillation column (15), is fed to the $C_2$-$C_{14}$ isomerisation unit (20) together with hydrogen (3). Unreacted hydrogen and possible gaseous by products (21) are removed from the $C_2$-$C_{14}$ isomerisation unit (20) and fed to the gas purification unit (5).

The isomerisation liquid product (22) is removed from the bottom of the isomerisation unit (20) and fed into a distillation column (15) which separates the hydrocarbon fractions from each other. In this case, the upper fraction consists of fuel gas (16), the next fraction downwards consists of the biogasoline

(17) of the invention and the bottom fraction consists of biodiesel (18). Between the biogasoline (17) and the biodiesel (18) there may be one or several other fractions. Futhermore, there can be one or several distillation (fractionation) units. Thus, the final product of the invention in this embodiment will partly contain isomerised fuel gas, biogasoline and biodiesel.

However, it should be appreciated that the invention is not restricted to the embodiments described above or to combinations thereof. There are also other ways than those particularly described above to carry out the invention without deviating from the scope of the claims.

EXAMPLE

HDO, Hydrocracking

Triglycerides from palm oil were hydrodeoxygenated with a sulfidized commercial NiMo catalyst at an average temperature of 324° C. and an average pressure of 5 MPa. The LHSV-value was kept at 0.24 h$^{-1}$ and the H/HC ratio was kept at 820 l/l. After that, formed water was removed from the obtained n-paraffin product. The n-paraffins were hydrocracked with a commercial Pt/molecular sieve catalyst at an average temperature of 311° C. and an average pressure of 4 MPa The LHSV value was 1.2 h$^{-1}$ and the H/HC ratio was 720 l/l.

Distillation

The product from hydrocracking was divided into three fractions by stabilization and distillation: gaseous components, gasoline and diesel fractions. The gasoline fraction was isomerised in a separate unit.

Gasoline Isomerisation

Prior to testing, the gasoline isomerisation catalyst was dried at 100° C. for 1 hour and reduced at 350° C. for 1 hour with hydrogen. Then, the temperature was decreased to 250° C. The gasoline feed, described in Table 1, was isomerised in hydrogen at 3.4 MPa. The product was then analysed and the octane numbers were calculated for the products. The octane numbers were between 63 and 68 compared to 57 for unisomerised gasoline.

Catalyst for Gasoline Isomerisation

The catalysts were prepared in following manner:

Firstly, the commercial zeolites were protonated into the acidic form of zeolite. Secondly, the zeolites were formulated to be suitable for the platinum addition. Then, platinum was added to the formulated zeolites in the form of a platinum salt, after which the resulting composition was treated to get a good platinum distribution. Finally, the catalyst was sieved before the microreactor tests.

Mordenite and beta-zeolite were used in protonated form. The protonated form of zeolite was made by ammonium ion exchange and calcination. 10 g of zeolite was ion-exchanged with 1 M ammonium nitrate aqueous solution for 24 h at ambient temperature. After ion-exchange the zeolite was washed thoroughly with distilled water, dried at 115° C. for 12 hours and calcined at 500° C. After calcinations, the zeolite powder was pressed, crushed and sieved to the particle size 0.07-0.15 mm.

The platinum source was the salt $Pt(NH_3)_4(NO_3)_2$. The pore volume of the catalyst was measured by water titration. The platinum source was dissolved in a predetermined amount of water. The total amount of catalyst material was 5.6 g and the amount of $Pt(NH_3)_4(NO_3)_2$ was 0.06 g. The catalyst was impregnated, dried at 115° C. overnight, and calcined at 350° C. in air for two hours. The rate of temperature increase was 0.2° C./min. The catalyst was sieved again to ensure the desired particle size. The platinum content of the catalysts was 0.5 wt-%.

The conditions and results of the tests are shown in the following Table 1.

TABLE 1

Gasoline isomerisation.

| Conditions | | Test 1 | Test 2 |
|---|---|---|---|
| Catalyst | | Pt/mordenite | Pt/beta |
| Temperature/° C. | | 250 | 250 |
| LHSV/1/h | | 1.4 | .0.6 |
| H2/HC/1/l | | 97 | 83 |
| Analysis | Feed | Product | Product |
| Ethane/wt-% | 0.0 | 0.6 | 0.5 |
| Propane/wt-% | 0.0 | 4.1 | 6.9 |
| n-Butane/wt-% | 0.6 | 1.6 | 1.8 |
| i-Butane/wt-% | 0.2 | 7.6 | 7.6 |
| n-Pentane/wt-% | 6.3 | 5.8 | 4.0 |
| i-Pentane/wt-% | 5.3 | 8.1 | 4.8 |
| di-i-Pentane/wt-% | 0.0 | 0.0 | 0.0 |
| Other C5/wt-% | 0.0 | 0.0 | 0.0 |
| n-Hexane/wt-% | 20.1 | 13.8 | 13.9 |
| i-Hexane/wt-% | 20.8 | 20.6 | 17.3 |
| di-i-Hexane/wt-% | 0.8 | 5.3 | 1.7 |
| other C6/wt-% | 0.2 | 0.2 | 0.2 |
| n-Heptane/wt-% | 11.4 | 5.5 | 7.7 |
| i-Heptane/wt-% | 23.7 | 14.6 | 19.8 |
| di-i-Heptane/wt-% | 1.8 | 7.4 | 6.6 |
| tri-i-Heptane/wt-% | 0.0 | 0.6 | 0.1 |
| other C7/wt-% | 2.0 | 1.9 | 2.3 |
| n-Octane/wt-% | 1.2 | 0.3 | 0.6 |
| i-Octane/wt-% | 3.3 | 0.7 | 2.3 |
| di-i-Octane/wt-% | 1.0 | 0.4 | 1.3 |
| other C8/wt-% | 0.3 | 0.4 | 0.5 |
| heavier/wt-% | 0.9 | 0.3 | 0.3 |
| Octane number | 57.2 | 68.1 | 63.7 |

It is important to notice that the use of a separate $C_2$-$C_{14}$ isomerisation step gave 11 or 19% better octane numbers, depending on whether the catalyst was Pt/beta-zeolite or Pt/mordenite, respectively.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

The invention claimed is:

1. Process for the preparation of an aliphatic $C_2$-$C_{14}$ hydrocarbon product from a natural fat or derivative thereof, the process comprising the steps of:
   (i) providing the natural fat or derivative thereof,
   (ii) deoxygenating the natural fat or derivative thereof originating from step (i) in the presence of a catalyst to yield an aliphatic $C_9$-$C_{28}$ hydrocarbon,
   (iii) hydrocracking the aliphatic $C_9$-$C_{28}$ hydrocarbon originating from step (ii) in the presence of a catalyst to yield a product comprising an aliphatic $C_2$-$C_{14}$ hydrocarbon,
   (iv) feeding the product of step (iii) to a distillation unit to provide a biogasoline product and a biodiesel product and fractions between said biogasoline product and biodiesel product,
   (v) recycling
      (a) part of said biogasoline product and said fractions between said biogasoline product and said biodiesel product, or
      (b) part of said biogasoline product, said fractions between said biogasoline product, and said biodiesel product from said distillation unit to a $C_2$-$C_{14}$ isomerisation unit,
   (vi) isomerising the recycled parts into an isomerised product,
   (vii) feeding said isomerised product to the distillation unit, and
   (viii) recovering said biogasoline product of isomerised $C_2$-$C_{14}$ hydrocarbon from the distillation unit.

2. Process according to claim 1, wherein in step (i), the natural fat provided comprises the triglycerides of $C_{10}$-$C_{28}$ fatty acids and the natural fat derivative is selected from the group consisting of mono- and diglycerides of $C_{10}$-$C_{28}$ fatty acids, $C_{10}$-$C^{28}$ fatty acids, $C_{10}$-$C_{28}$ fatty acid anhydrides, non-glyceride $C_{10}$-$C_{28}$ fatty acid esters, $C_{10}$-$C_{28}$ fatty alcohols, and corresponding compounds with and without hydrocarbyl substitution, branching or unsaturation.

3. Process according to claim 1, wherein the deoxygenating step (ii) is carried out by hydrolyzing, decarbonylating, decarboxylating, or hydrodeoxygenating, the natural fat or derivative thereof.

4. Process according to claim 3, wherein the deoxygenating step (ii) is carried out by feeding hydrogen and the natural fat or derivative thereof through a catalyst bed comprising the catalyst.

5. Process according to claim 3, wherein the hydrodeoxygenating step (ii) is carried out in the presence of a hydrogenation catalyst which contains a metal selected from any one of Groups 6 to 10 of the Periodic Table supported on alumina or silica.

6. Process according to claim 1, wherein the hydrocracking step (iii) is carried out by feeding the aliphatic $C_9$-$C_{28}$ hydrocarbon originating from step (ii) in liquid form together with hydrogen gas through a reactor having hydrocracking conditions and a hydrocracking catalyst.

7. Process according to claim 1, wherein in the hydrocracking step (iii), the feeding rate LHSV of the aliphatic $C_9$-$C_{28}$ hydrocarbon is between 0.1 and 10 l/h, and the volume ratio between the hydrogen and the volume ratio of hydrogen to the aliphatic $C_9$-$C_{28}$ hydrocarbon in the feed is between 10 and 2000 $m^3/m^3$ (NTP).

8. Process according to claim 6, wherein in the hydrocracking step (iii), the temperature is maintained between 100 and 700° C., and the pressure is maintained between 1 to 20 MPa.

9. Process according to claim 6, wherein the hydrocracking catalyst of the hydrocracking step (iii) contains a molecular sieve providing acidic function, and a transition metal selected from any one of Groups 8 to 10 of the Periodic Table providing metallic function.

10. Process according to claim 9, wherein the catalyst of the hydrocracking step (iii) contains as the molecular sieve SAPO-11, SAPO-41, ZSM-12, ZSM-22, ZSM-23, ZSM-48 or ferrierite and as the transition metal Pt, Pd or Ni, and as a carrier $Al_2O_3$ or $SiO_2$.

11. Process according to claim 1, wherein the $C_2$-$C_{14}$ hydrocarbon isomerisation step (iv) is carried out at a temperature between 100 and 500° C.

12. Process according to claim 1, wherein the $C_2$-$C_{14}$ hydrocarbon isomerisation step (iv) is carried out in the presence of a catalyst based on a hydrogen transfer component and an acid component.

13. Process according to claim 12, wherein the isomerisation step (iv) is carried out in the presence of a catalyst based on platinum as the hydrogen transfer component and protonated mordenite or protonated beta-zeolite as the acid component.

14. Process according to claim 1, wherein at least part of the aliphatic $C_9$-$C_{28}$ hydrocarbon formed in the deoxygenating step (ii) is isomerised in a $C_9$-$C_{28}$ hydrocarbon isomerisation step (ii') to give an isomerised aliphatic $C_9$-$C_{28}$ hydrocarbon, at least part of which is recovered as heavy fuel or in step (iii) hydrocracked into an aliphatic $C_2$-$C_{14}$ hydrocarbon.

15. Process according to claim 14, wherein the aliphatic $C_9$-$C_{28}$ hydrocarbon obtained in the deoxygenating step (ii) or the $C_9$-$C_{28}$ isomerisation step (ii'), is at least partly hydrocracked in step (iii) into an aliphatic $C_2$-$C_8$ hydrocarbon, the rest that may remain from steps (ii) or (ii') being separated and recovered as heavier ($C_9$-$C_{28}$) fuel or a raw material thereof, or fed back to the hydrocracking step (iii).

16. Process according to claim 14, wherein the aliphatic $C_9$-$C_{28}$ hydrocarbon obtained in the deoxygenating step (ii) or the $C_9$-$C_{28}$ isomerisation step (ii'), is substantially hydrocracked in step (iii) into an aliphatic $C_2$-$C_8$ hydrocarbon.

17. Process according to claim 4, wherein the deoxygenating step (ii) is carried out by feeding hydrogen and the natural fat or derivative thereof through a catalyst bed at a temperature of 100 to 450° C. and at a pressure of 1 to 20 MPa.

18. Process according to claim 5, wherein the metal is selected from a group consisting of Pd, Pt, Ni, NiMo, or CoMo.

19. Process according to claim 9, wherein the amount of the molecular sieve is from 20 to 80% by weight, and the amount of transition metal is from 0.1 to 30% by weight of the hydrocracking catalyst.

20. Process according to claim 10, wherein the catalyst of the hydrocracking step (iii) is selected from a group consisting of Pt/SAPO-11/$Al_2O_3$, Pt/SAPO-11/$SiO_2$, Pt/ZSM-12/$Al_2O_3$, PT/ZSM-22/$Al_2O_3$ and Pt/ZSM-23/$Al_2O_3$ and Pt/ZSM-48/$Al_2O_3$.

* * * * *